(12) United States Patent
Oshman et al.

(10) Patent No.: US 11,518,317 B2
(45) Date of Patent: Dec. 6, 2022

(54) CARGO RACKS WITH A TILTING MECHANISM

(71) Applicants: Joseph Oshman, Portland, OR (US); Zachary Meyer, Portland, OR (US)

(72) Inventors: Joseph Oshman, Portland, OR (US); Zachary Meyer, Portland, OR (US)

( * ) Notice: Subject to any disclaimer, the term of this patent is extended or adjusted under 35 U.S.C. 154(b) by 0 days.

(21) Appl. No.: 17/714,487

(22) Filed: Apr. 6, 2022

(65) Prior Publication Data

US 2022/0227303 A1 Jul. 21, 2022

(51) Int. Cl.
B60R 9/06 (2006.01)
(52) U.S. Cl.
CPC ...................................... B60R 9/06 (2013.01)
(58) Field of Classification Search
CPC .. B60R 9/06; B60R 9/10; B60R 9/042; B60R 9/08; B62H 3/12; Y10S 224/924
See application file for complete search history.

(56) References Cited

U.S. PATENT DOCUMENTS

| | | | | |
|---|---|---|---|---|
| 5,526,971 A | * | 6/1996 | Despain | B60R 9/06 224/532 |
| 5,685,686 A | * | 11/1997 | Burns | B60R 9/10 403/374.5 |
| 6,129,371 A | * | 10/2000 | Powell | B60R 9/06 280/491.5 |
| 6,460,745 B1 | * | 10/2002 | Weaver | B60R 9/06 224/519 |
| 9,321,407 B2 | * | 4/2016 | Loken | B60R 9/06 |
| 9,376,063 B2 | * | 6/2016 | Hein | B60R 9/06 |
| 11,142,133 B1 | * | 10/2021 | Oshman | B60R 9/10 |
| 11,351,929 B2 | * | 6/2022 | McFadden | B60R 9/10 |
| 2003/0080169 A1 | * | 5/2003 | Munoz | B60R 9/10 224/501 |
| 2004/0004099 A1 | * | 1/2004 | Crouch | B60R 9/06 224/504 |
| 2005/0082329 A1 | * | 4/2005 | Cohen | B60R 9/10 224/924 |
| 2011/0057008 A1 | * | 3/2011 | Clausen | B60R 9/10 224/504 |
| 2013/0327802 A1 | * | 12/2013 | Hammond | B60R 9/10 211/17 |
| 2014/0151421 A1 | * | 6/2014 | Loken | B60R 9/06 224/519 |

(Continued)

*Primary Examiner* — Brian D Nash
(74) *Attorney, Agent, or Firm* — Mohr Intellectual Property Law Solutions, P.C.

(57) ABSTRACT

Cargo racks configured to mount to a hitch of a vehicle and to support cargo. The cargo racks include a tongue, a mast, and a tilting mechanism. The tilting mechanism pivotally couples the mast and the tongue. The tilting mechanism includes a stationary plate, a tilt plate, a catch mechanism, a push plate, and an actuator. The stationary plate is coupled to the tongue. The tilt plate is coupled to the mast and pivotally coupled to the stationary plate. The catch mechanism is operable to selectively restrict the tilt plate pivoting relative to the stationary plate. The push plate is operable to move the catch between a restriction position restricting the tilt plate from pivoting relative to the stationary plate and a release position enabling the tilt plate to pivot relative to the stationary plate. The actuator is operable to selectively move the push plate relative to the tilt plate.

18 Claims, 12 Drawing Sheets

(56) References Cited

U.S. PATENT DOCUMENTS

| | | | |
|---|---|---|---|
| 2014/0246467 A1* | 9/2014 | Hein | B60R 9/06 224/400 |
| 2014/0263512 A1* | 9/2014 | McCoy | B60R 9/06 29/428 |
| 2014/0291373 A1* | 10/2014 | Wang | B60R 9/06 224/549 |
| 2018/0354427 A1* | 12/2018 | Yazdian | B60R 9/10 |
| 2019/0161022 A1* | 5/2019 | McFadden | B60R 9/06 |
| 2020/0406830 A1* | 12/2020 | Owen | B62H 3/12 |
| 2021/0009223 A1* | 1/2021 | Tsai | B62H 3/00 |
| 2021/0101428 A1* | 4/2021 | Bowles | B60R 9/10 |
| 2021/0245671 A1* | 8/2021 | Harrill | B60R 9/045 |
| 2022/0048345 A1* | 2/2022 | Oshman | B60R 9/06 |
| 2022/0176886 A1* | 6/2022 | Sailer | B60R 9/06 |

\* cited by examiner

CARGO RACKS WITH A TILTING MECHANISM

BACKGROUND

The present disclosure relates generally to cargo racks. In particular, cargo racks with a tilting mechanism are described.

Cargo racks are useful for supporting cargo, such as luggage, tools, spare tires, or recreation equipment like icicles, skis, or snowboards, on a vehicle or structure. For convenience, this document will focus on cargo racks secured to vehicles with the understanding that securing a cargo rack to a structure, such as a wall or support, is merely a minor adaptation of cargo racks secured to vehicles.

Cargo racks come in different forms. Some cargo racks are fixed structures while others are designed to move in some fashion to make loading or unloading cargo easier. Cargo racks designed to move may also serve to enable more convenient access to areas near the cargo rack, such as a trunk or hatch of a vehicle.

Known cargo racks are not entirely satisfactory. For example, existing cargo racks do not move in a desired manner over a desired range with sufficient control, safety, or convenience. Conventional racks that are designed to move are prone to move at unintended times, which creates a safety hazard and puts the cargo items at risk of damage.

Further, conventional moving racks tend to provide insufficient control when they are selectively moved. A user attempting to move a conventional rack may experience the rack give way unexpectedly, jerk, stick, or seize. Unpredictable and/or poor movement characteristics can be dangerous and unpleasant.

It would be desirable to have a cargo rack with safety and control features that made moving the rack safer and more controlled. It would be beneficial for a cargo rack to be configured to maintain a desired position in a secure manner. Ergonomic benefits would derive from a cargo rack that could be safely controlled from a standing position without having to awkwardly bend over to operate the rack.

Thus, there exists a need for cargo racks that improve upon and advance the design of known cargo racks. Examples of new and useful cargo racks relevant to the needs existing in the field are discussed below.

United States patent filings with disclosure relevant to cargo racks include the following U.S. patent filings identified by either patent number, publication number, or application number: U.S. Pat. Nos. 10,850,678, and 11,142,133. The complete disclosures of these listed U.S. patent fillings are herein incorporated by reference for all purposes.

SUMMARY

The present disclosure is directed to cargo racks configured to mount to a hitch of a vehicle and to support cargo. The cargo racks include a tongue, a mast, and a tilting mechanism.

The tilting mechanism pivotally couples the mast and the tongue. The tilting mechanism includes a stationary plate, a tilt plate, a catch mechanism, a push plate, and an actuator.

The stationary plate is coupled to the tongue. The tilt plate is coupled to the mast and pivotally coupled to the stationary plate. The catch mechanism is operable to selectively restrict the tilt plate pivoting relative to the stationary plate.

The push plate is operable to move the catch between a restriction position restricting the tilt plate from pivoting relative to the stationary plate and a release position enabling the tilt plate to pivot relative to the stationary plate. The actuator is operable to selectively move the push plate relative to the tilt plate.

DETAILED DESCRIPTION

Figure 1:
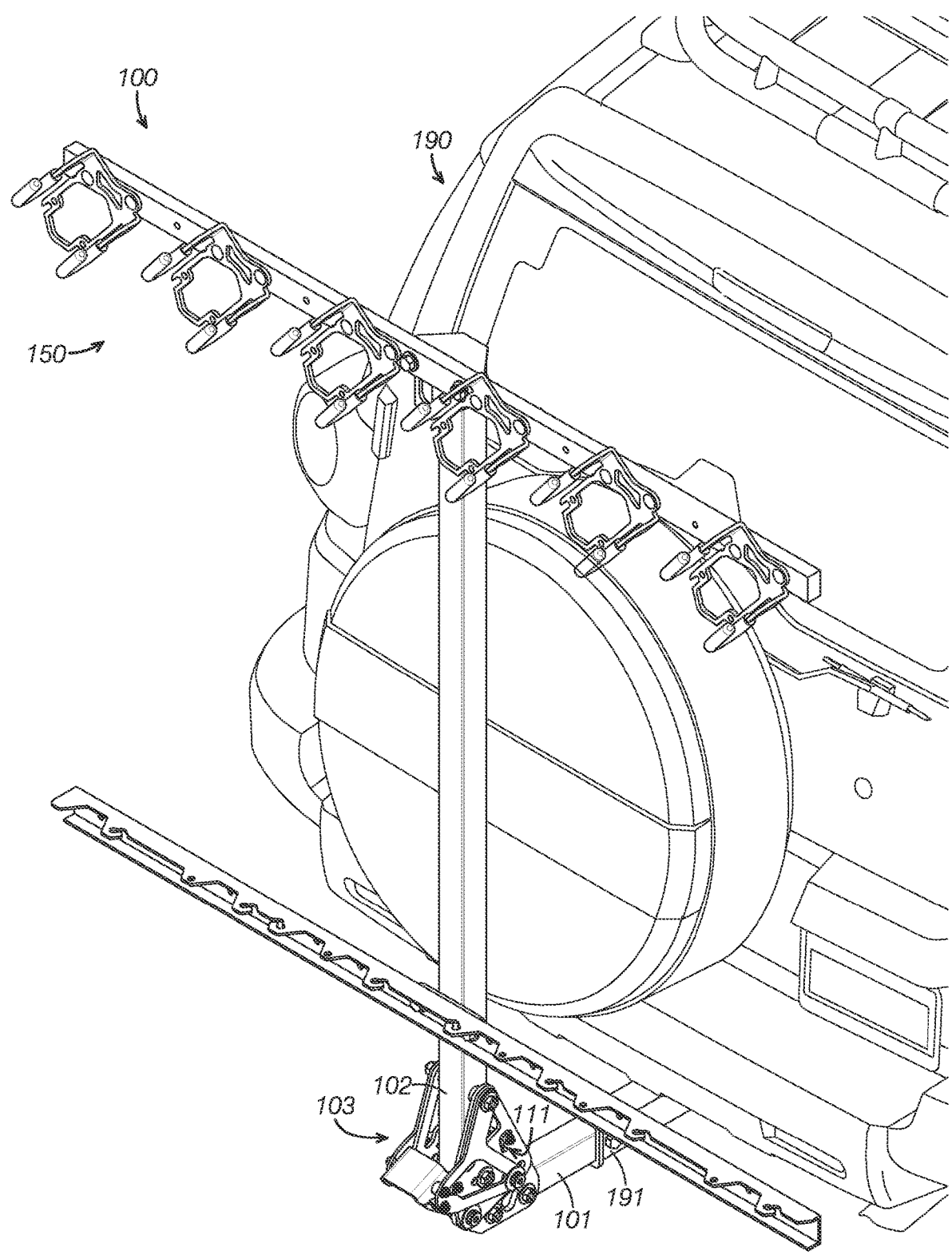
FIG. 1 is a perspective view of a first embodiment of a cargo rack mounted to a vehicle.
Figure 2:
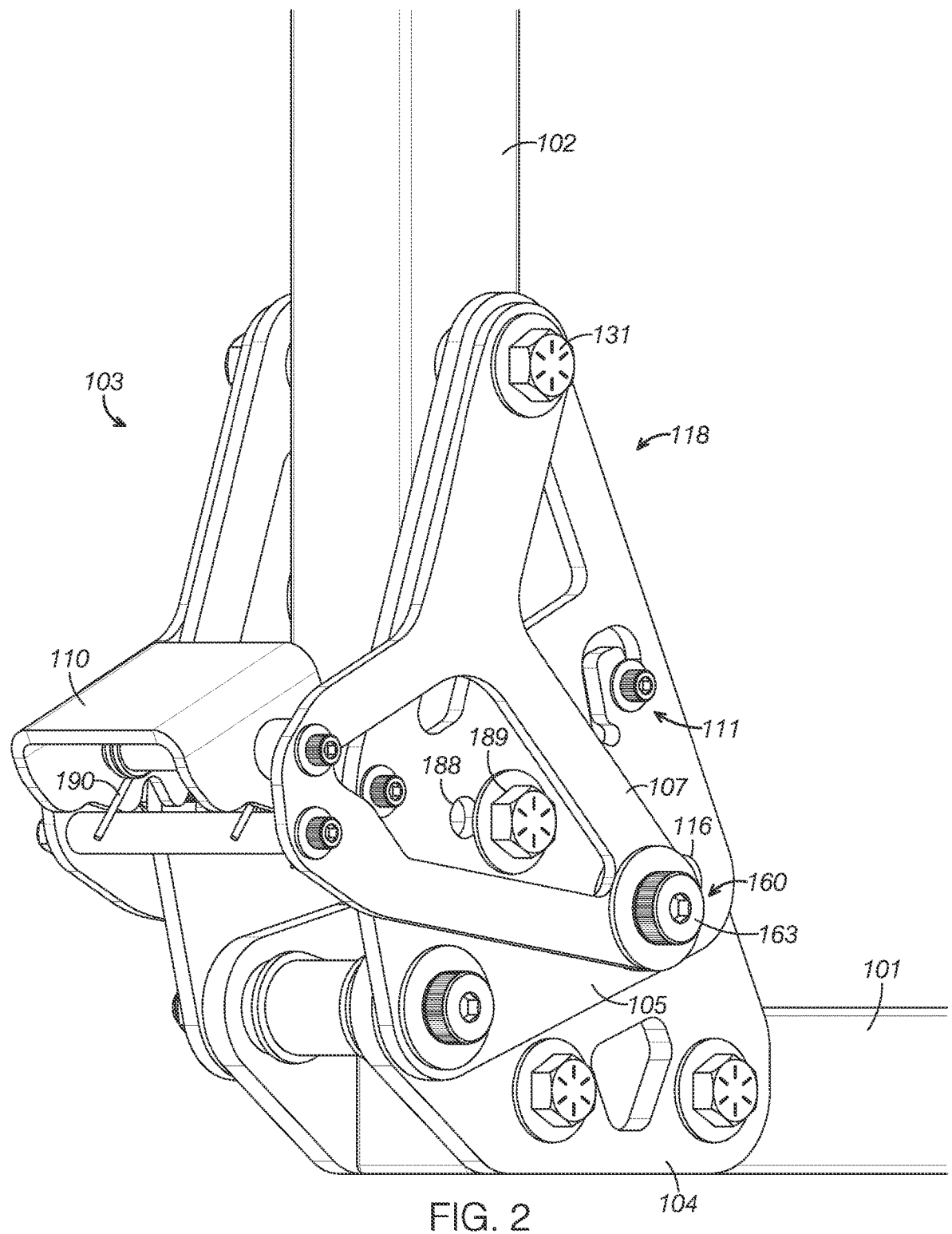
FIG. 2 is a front perspective view of a tilting mechanism of the cargo rack shown in FIG. 1.

The disclosed cargo racks will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various cargo racks are provided. Related features in the examples may be identical, similar, or dissimilar in different examples. For the sake of brevity, related features will not be redundantly explained in each example. Instead, the use of related feature names will cue the reader that the feature with a related feature name may be similar to be related feature in an example explained previously. Features specific to a given example will be described in that particular example. The reader should understand that a given feature need not be the same or similar to the specific portrayal of a related feature in any figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Cargo Racks with a Tilting Mechanism

With reference to the figures, cargo racks with a tilting mechanism will now be described. The cargo racks discussed herein function to moveably support cargo in a safe and controlled manner.

The reader will appreciate from the figures and description below that the presently disclosed cargo racks address many of the shortcomings of conventional cargo racks. For example, the novel cargo racks below are configured to move selectively, safely, and conveniently over a wide range under user control. The novel cargo racks described herein include safety features to restrict or prevent the racks moving at unintended times, which avoid the attendant safety hazards and risk of cargo damage.

The novel cargo racks disclosed in this document restrict or prevent the racks suddenly giving way, jerking, sticking, or seizing. With more controlled movement characteristics, the novel racks herein are safer and more pleasant to operate.

As the reader will see from the discussion below, the novel cargo racks herein make moving the rack safe and controlled. Further, the novel cargo racks are configured to maintain a desired position in a secure manner. The novel cargo racks provide ergonomic benefits from being safety controlled from a standing position without having to awkwardly bend over to operate the racks.

Contextual Details

Ancillary features relevant to the cargo racks described herein will first be described to provide context and to aid the discussion of the cargo racks.

Cargo

The cargo racks described below function to support cargo. A wide variety of types may be supported on the cargo racks. Cargo suitable to be supported by the cargo racks below include luggage, tools, spare tires, and recreation equipment like bicycles, skis, or snowboards. For convenience, the description below will focus on cargo in the form of bicycles, but the reader should understand that the cargo racks may support any currently known or later developed type of cargo.

Cargo Rack Embodiment One

With reference to FIGS. 1-12, a cargo rack 100 will now be described as a first example of a cargo rack. As shown in FIGS. 1-12, cargo rack 100 includes a tongue 101, a mast 102, a tilting mechanism 103, a safety mechanism 111, and a cargo support system 150. In other examples, the cargo rack includes fewer components than depicted in the figures. In certain examples, the cargo rack includes additional or alternative components than depicted in the figures.

The size and shape of the cargo rack may be varied as needed for a given application. In some examples, the cargo rack is larger relative to the other components than depicted in the figures. In other examples, the cargo rack is smaller relative to the other components than depicted in the figures. Further, the reader should understand that the cargo rack and the other components may all be larger or smaller than described herein while maintaining their relative proportions.

Cargo Support System

Cargo support system 150 functions to support cargo. In the present example, cargo support system 150 is a bike rack. However, the cargo support system may be any currently known or later developed system for supporting cargo, such as luggage racks, ski racks, spare tire brackets, and the like.

As shown in FIG. 1, cargo support system 150 is supported mast 102. Cargo support system 150 is vertically spaced from tongue 101 and tilting mechanism 103. As shown in FIG. 1, cargo support system 150 is at a convenient height to be manipulated by a user standing behind a vehicle 190.

Tongue

As shown in FIG. 1, tongue 101 functions to couple cargo rack 100 to a vehicle. In the present example, tongue 101 is complementarily configured with a hitch receiver 191 of vehicle 190.

The size and shape of the tongue may be varied as needed for a given application. In some examples, the tongue is larger relative to the other components than depicted in the figures. In other examples, the tongue is smaller relative to the other components than depicted in the figures. Further, the reader should understand that the tongue and the other components may all be larger or smaller than described herein while maintaining their relative proportions.

The tongue may be any currently known or later developed type of tongue. A variety of tongue types exist and could be used in place of the tongue shown in the figures. In addition to the types or tongues existing currently, it is contemplated that the cargo racks described herein could incorporate new types of tongues developed in the future.

In the present example, the tongue is composed of metal. However, the tongue may be composed of any currently known or later developed material suitable for the applications described herein for which it is used. Suitable materials include metals, polymers, ceramics, wood, and composite materials.

Mast

Mast 102 functions to support cargo support system 150. The mast may be any currently known or later developed type of mast. A variety of mast types exist and could be used in place of the mast shown in the figures. In addition to the types of masts existing currently, it is contemplated that the cargo racks described herein could incorporate new types of masts developed in the future.

The size and shape of the mast may be varied as needed for a given application. In some examples, the mast is larger relative to the other components than depicted in the figures. In other examples, the mils, is smaller relative to the other components than depicted in the figures. Further, the reader should understand that the mast and the other components may all be larger or smaller than described herein while maintaining their relative proportions.

In the present example, the mast is composed of metal. However, the mast may be composed of any currently known or later developed material suitable for the applications described herein for which it is used. Suitable materials include metals, polymers, ceramics, wood, and composite materials.

Tilting Mechanism

As shown in FIGS. 1-12 tilting mechanism 103 pivotally couples mast 102 and tongue 101. The reader can see in FIGS. 5-10 that tilting mechanism 103 functions to enable mast 102 to move to different pivot positions relative to tongue 101.

Tilting mechanism 103 includes a stationary plate 104, a tilt plate 105, a catch mechanism 160, a push plate 107, and an actuator 110. Each of these components and the pivot positions are described in the sections below.

Pivot Positions

As shown in FIGS. 5-10, mast 102 moves over a variety of pivot positions by tilting mechanism 103. The various pivot positions are designated first, second, third, etc., pivot positions for reference purposes. The number of pivot positions in the cargo rack may be selected to meet the needs of a given application. The reader should appreciate that the number of pivot positions may be different in other examples than is shown in the figures. For instance, some cargo rack examples include additional or fewer pivot positions than described in the present example.

Figure 8:
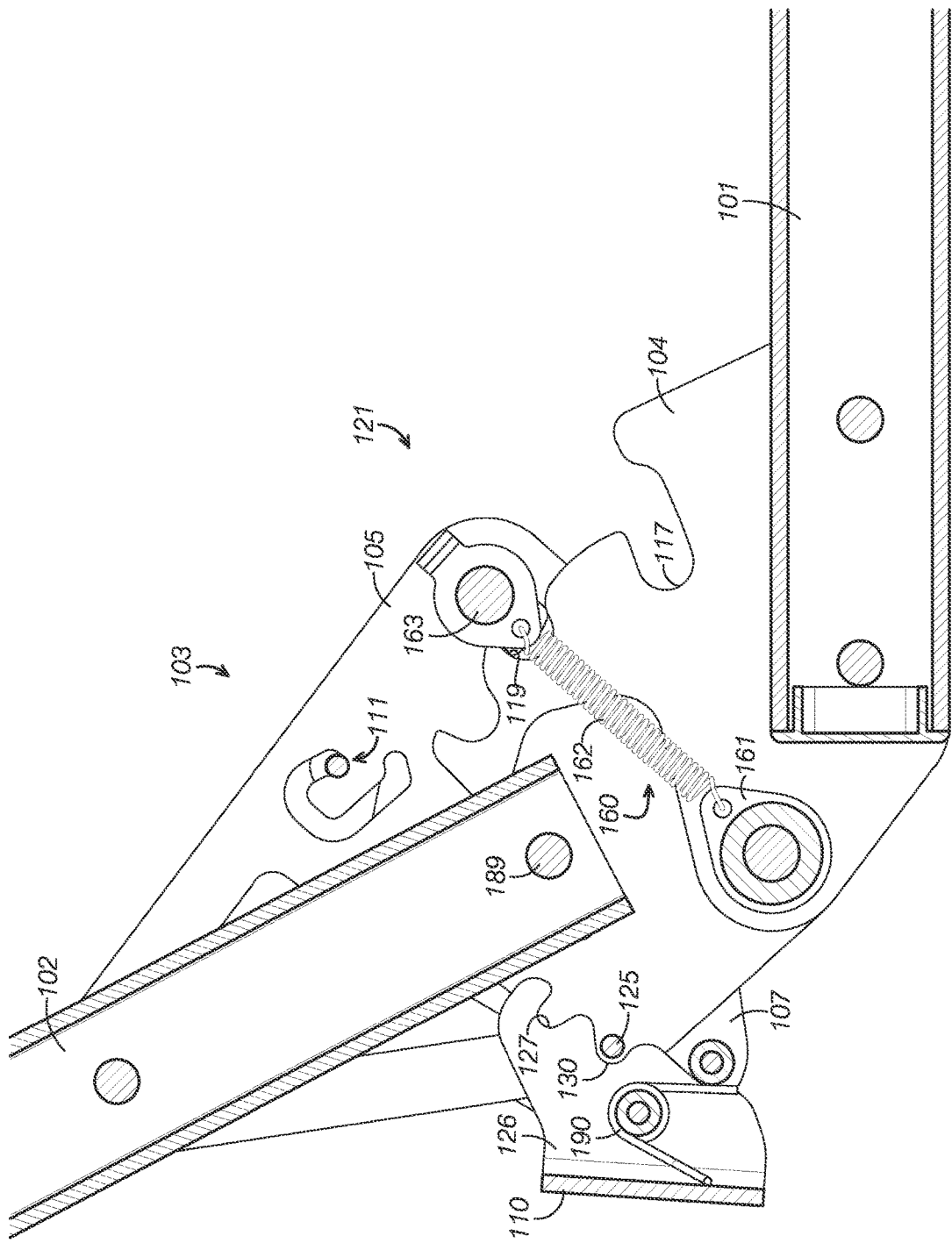
FIG. 8 is a side elevation view of a section of the tilting mechanism shown in FIG. 2 with the tilting mechanism in the second pivot position.

As shown in FIGS. 5, 6, 11, and 12, mast 102 is oriented vertically and substantially perpendicular to tongue 101 in first pivot position 118. The reader can see in FIG. 8 that second pivot 8 position 121 is angularly spaced from first pivot position 118. With reference to FIG. 8, mast 102 is tilted away from tongue 101 about an obtuse angle in second pivot position 121.

In some examples, the mast is oriented substantially horizontally in the first pivot position rather than vertically as shown in the figures. In such examples, the mast may selectively move from a horizontal orientation in the first pivot position upwards towards a vertical orientation in other pivot positions. In some examples, the mast moves from a substantially horizontal position in a first pivot position to a substantially vertical orientation in a final pivot position.

Stationary Plate

Stationary plate 104 cooperates with catch mechanism 160 and tilt plate 105 to selectively secure mast 102 in a selected pivot position. As depicted in FIGS. 1-12, stationary plate 104 is coupled to tongue 101. The reader can see in FIGS. 5-10 that stationary plate 104 supports catch mechanism 160.

As shown in FIGS. 5-12, stationary plate 104 defines multiple pockets, including a first pocket 117 and a second pocket 119. As shown in FIGS. 5-12, each pocket, including first pocket 117 and second pocket 119, is complementarily configured with catch 163. The pockets serve to receive catch 163 of catch mechanism 160.

Figure 5:
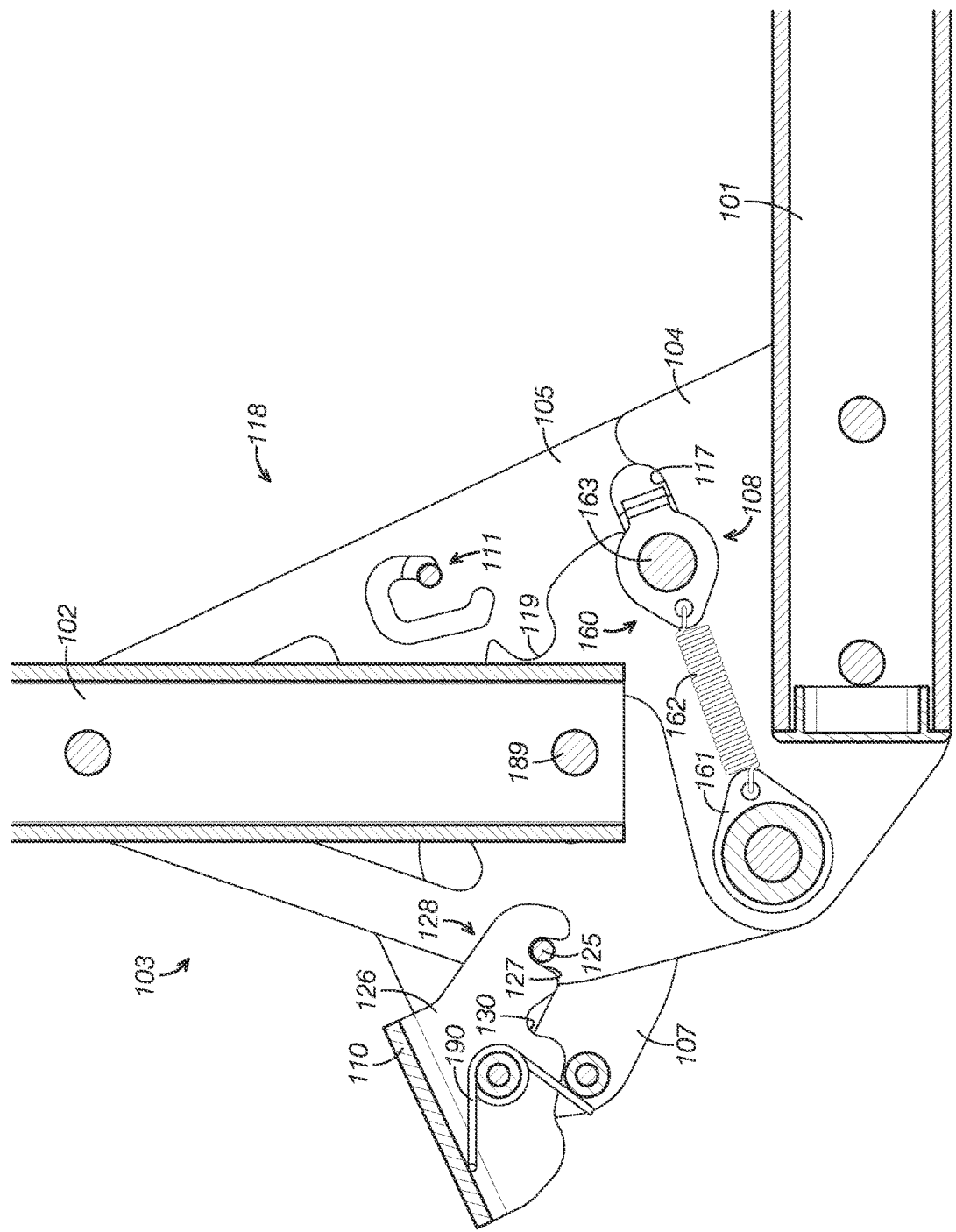
FIG. 5 is a side elevation view of a section of the tilting mechanism shown in FIG. 2 with an actuator in an engaged position and the tilting mechanism in a first pivot position.

When catch 163 is disposed within a pocket, mast 102 is restricted from pivoting relative to tongue 101. For example, tilt plate 105 is restricted from pivoting relative to stationary plate 104 when catch 163 is disposed in first pocket 117 as depicted in FIG. 5 or disposed in second pocket 119 as is almost shown in FIG. 8 (catch 163 is not fully disposed in second pocket 119 in FIG. 8, but the reader can see how catch 163 would restrict tilt plate 105 from pivoting relative to stationary plate 104 if it were fully disposed in second pocket 119).

Figure 6:
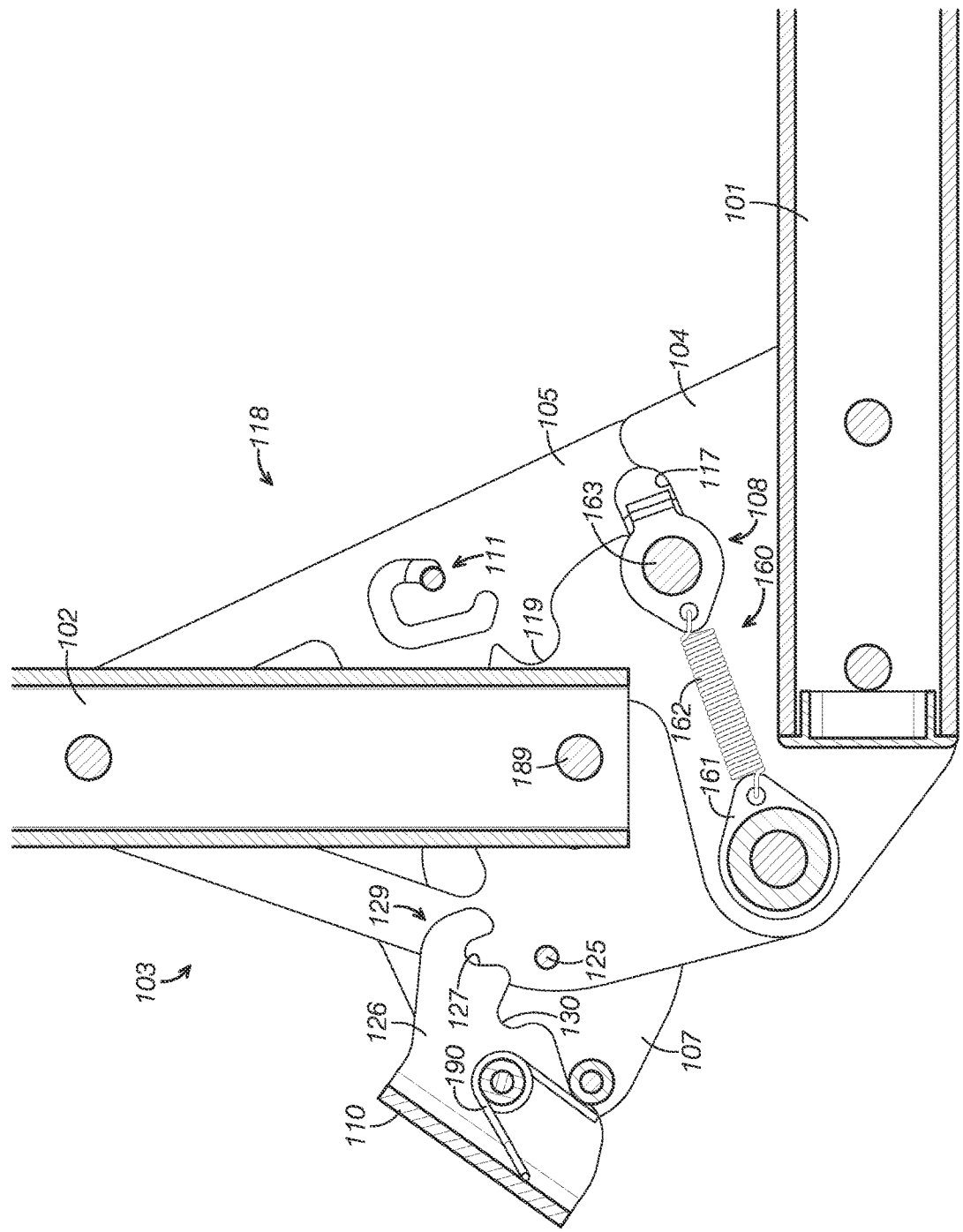
FIG. 6 is a side elevation view of a section of the tilting mechanism shown in FIG. 2 with the actuator in a release position and the tilting mechanism in the first pivot position.
Figure 7:
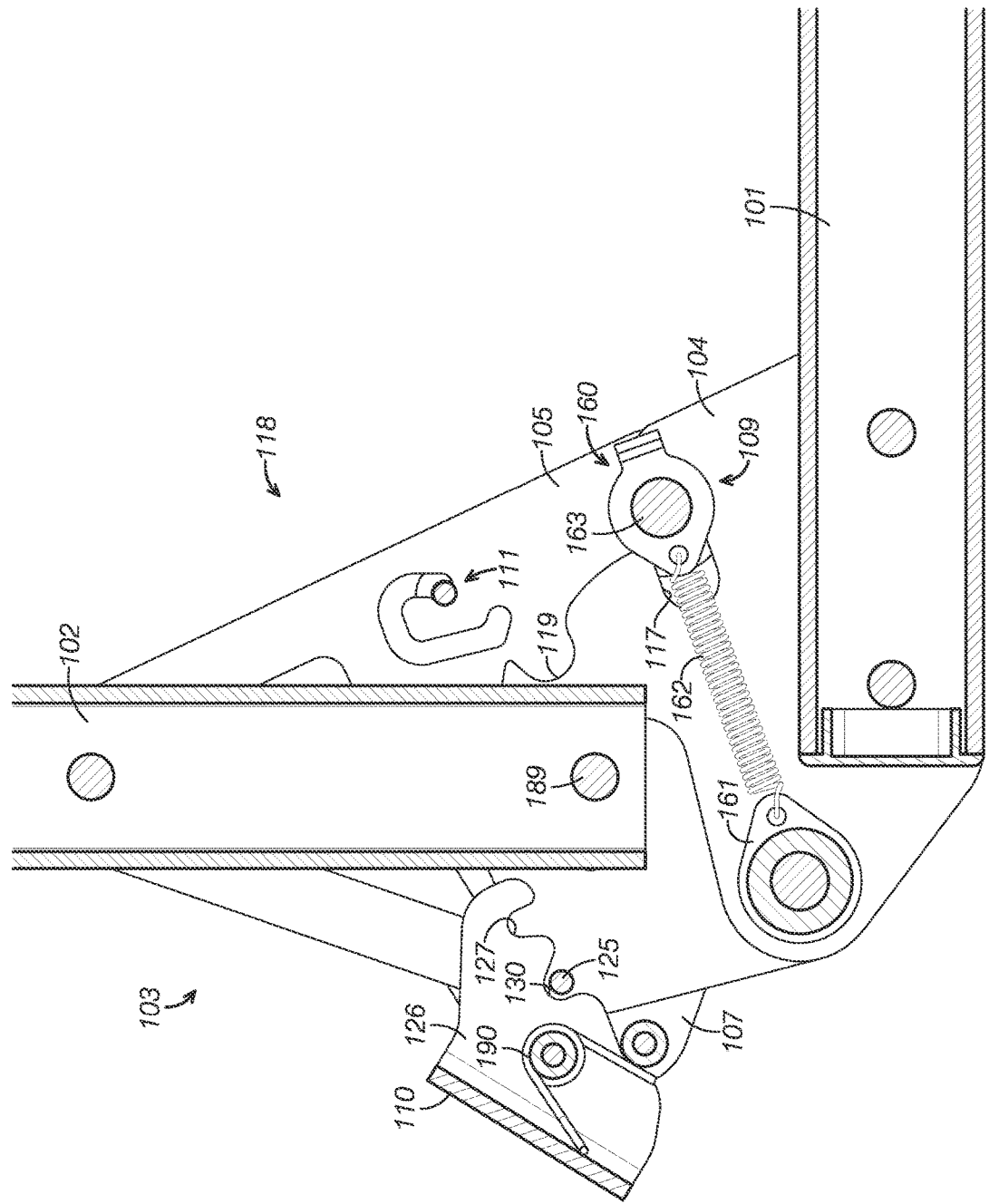
FIG. 7 is a side elevation view of a section of the tilting mechanism shown in FIG. 2 with the actuator moving a push plate forward and the tilting mechanism transitioning from the first pivot position to a second pivot position.

The reader can see in FIGS. 5, 6, 11, and 12 that mast 102 is in a first pivot position 118 relative to tongue 101 when catch 163 is in first pocket 117 and when catch 163 has just exited first pocket 117 before tilt plate 105 pivots relative to stationary plate 104 as depicted in FIG. 7. As forecasted in FIG. 8, mast 102 is in a second pivot position 121 relative to tongue 101 when catch 163 is in second pocket 119. The reader can see in FIGS. 5-12 that second pocket 119 is disposed along a tilt arc defined by tilt plate 105 pivoting relative to stationary plate 104.

The number of pockets in the cargo rack may be selected to meet the needs of a given application. The reader should appreciate that the number of pockets may be different in other examples than is shown in the figures. For instance, some cargo rack examples include additional or fewer pockets than described in the present example.

Figure 11:
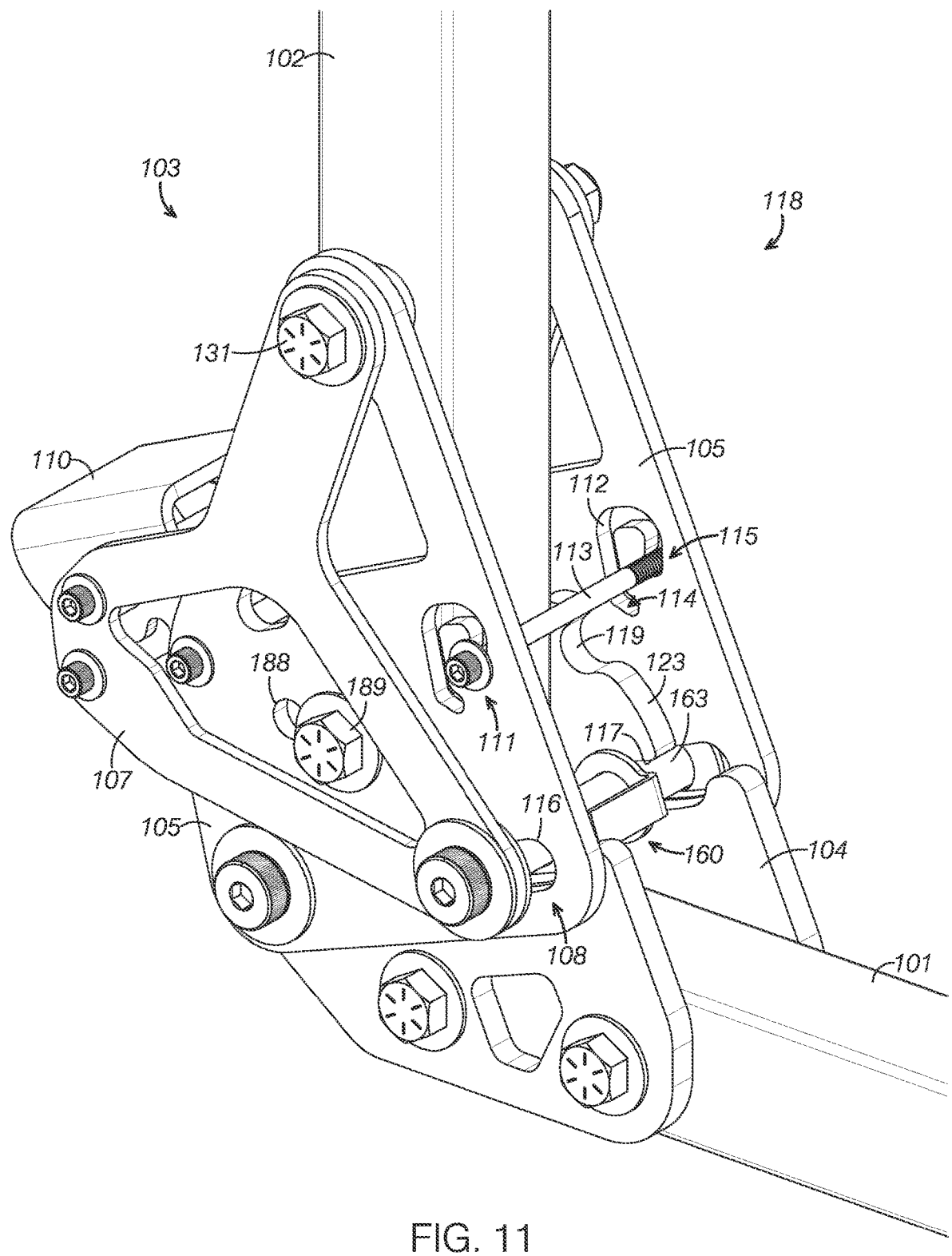
FIG. 11 is a rear perspective view of the tilting mechanism shown in FIG. 2 with a safety pin in a free position.
Figure 12:
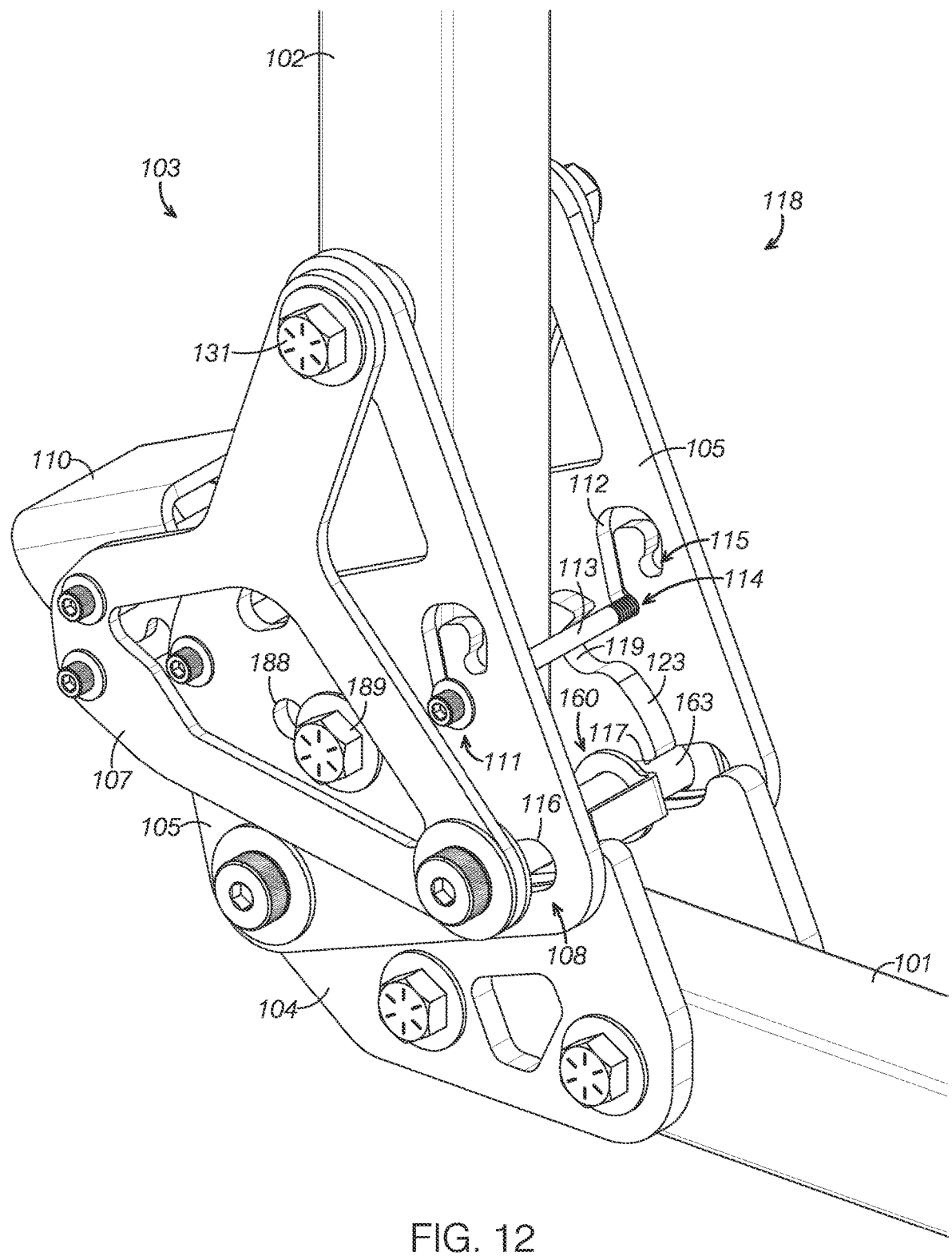
FIG. 12 is a rear perspective view of the tilting mechanism shown in FIG. 2 with a safety pin in safety position.

With reference to FIGS. 2-4, 11, and 12, stationary plate 104, tilt plate 105, and push plate 107 each have major faces that extend in parallel planes. As depicted in FIGS. 11 and 12, stationary plate 104 includes a minor face 123. With reference to FIGS. 11 and 12, minor face 123 extends parallel to a longitudinal axis of catch 163. As shown in FIGS. 11 and 12, minor face 123 defines an arc path complimenting the tilt arc of tilting mechanism 103 to guide catch 163 as it moves between pockets.

The size and shape of the stationary plate may be varied as needed for a given application. In some examples, the stationary plate is larger relative to the other components than depicted in the figures. In other examples, the stationary plate is smaller relative to the other components than depicted in the figures. Further, the reader should understand that the stationary plate and the other components may all be larger or smaller than described herein while maintaining their relative proportions.

In the present example, the stationary plate is composed of metal. However, the stationary plate may be composed of any currently known or later developed material suitable for the applications described herein for which it is used. Suitable materials include metals, polymers, ceramics, wood, and composite materials.

Tilt Plate

Tilt plate 105 cooperates with catch mechanism 160 and stationary plate 104 to selectively secure mast 102 in a selected pivot position. As shown in FIGS. 2, 3, 11, and 12, tilt plate 105 is coupled to mast 102 and pivotally coupled to stationary plate 104.

The reader can see in FIGS. 2, 3, 11, and 12 that tilt plate 105 defines a catch opening 116. As shown in FIGS. 2, 3, 11, and 12, catch opening 116 is complementarily configured with catch 163.

With reference to FIGS. 5-10, tilt plate 105 includes a projection 125 proximate to actuator 110. Actuator 110 selectively engages projection 125 to selectively restrict tilt plate 105 from moving relative to stationary plate 104.

As shown in FIGS. 2-4, 11, and 17, tilt plate 105 and push plate 107 share a common pivot 131. However, in other examples the tilt plate and the push plate have separate pivots rather than a common pivot.

Figure 3:
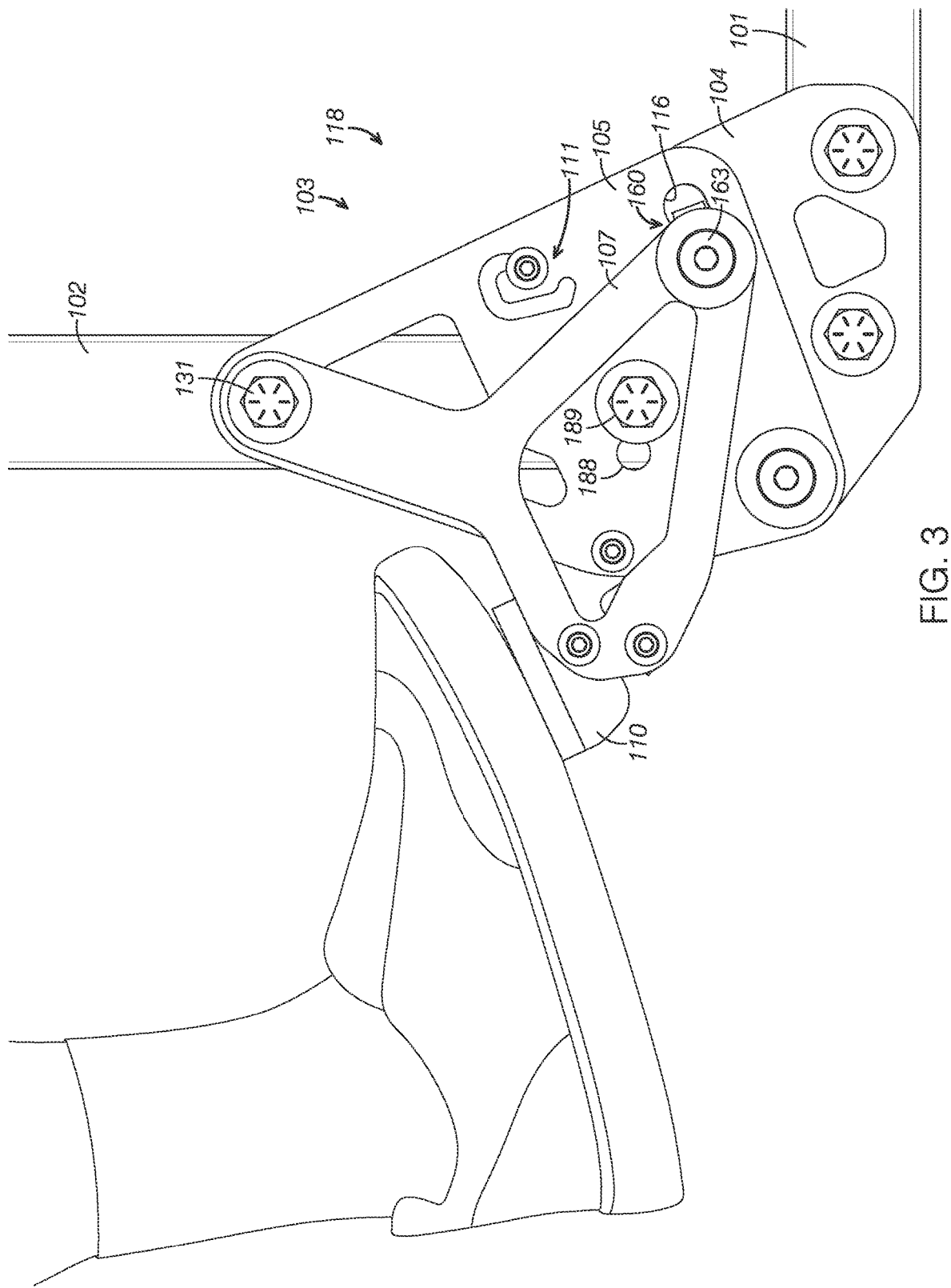
FIG. 3 is a side elevation view of the tilting mechanism shown in FIG. 2.
Figure 4:
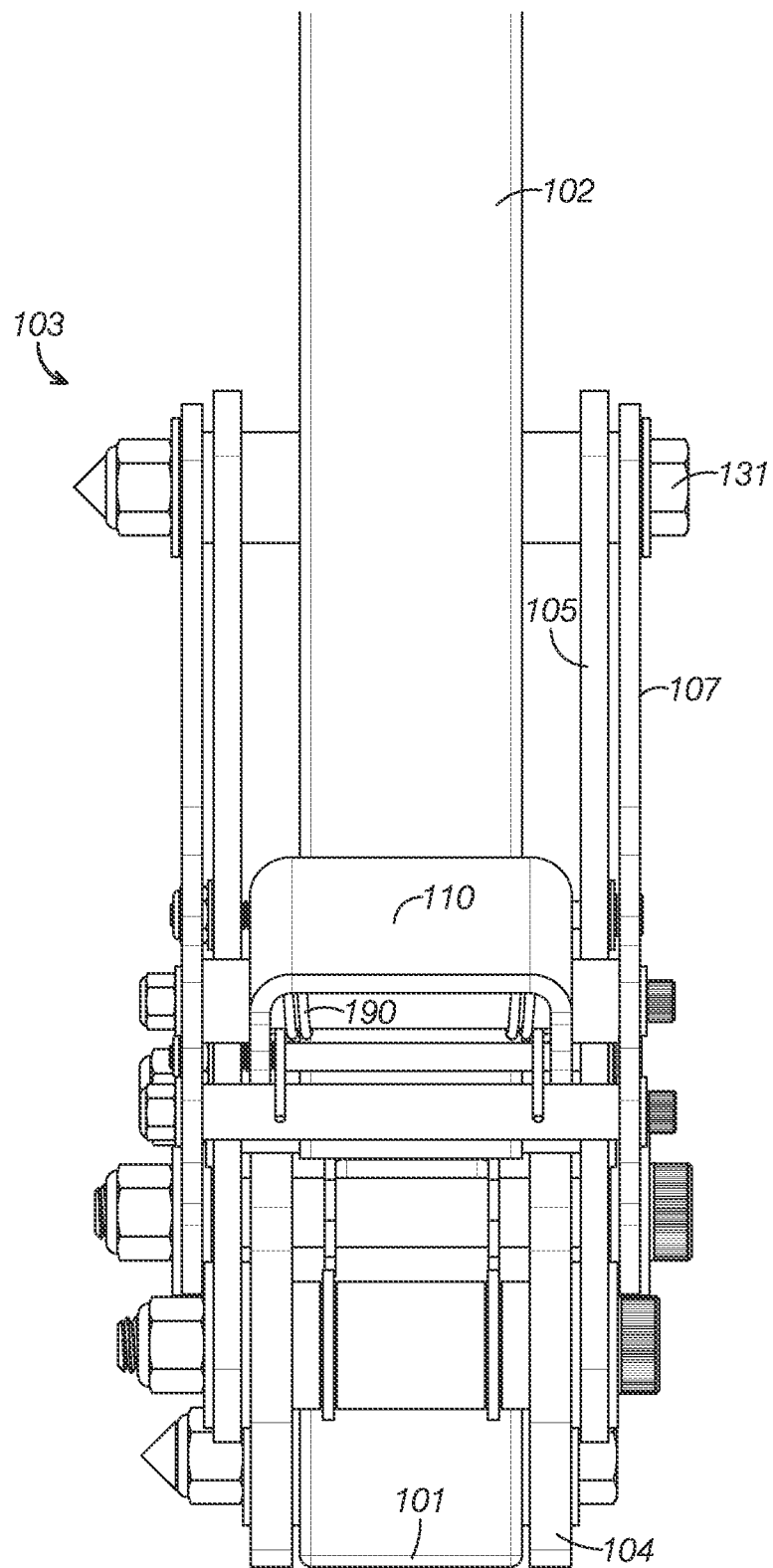
FIG. 4 is a front elevation view of the tilting mechanism shown in FIG. 2.

In FIGS. 3, 11, and 12, the reader can see an optional hole 188 defined tilt plate 105. Optional hole 188 provides the user with the option of adjusting the orientation or mast 102 relative to tilt plate 105. By extending a lower bolt 189 securing mast 102 to tilt plate 105 through optional 188, mast 102 would be tilted closer to vehicle 190 in the first pivot position. Mast 102 be tilted closer to vehicle 190 in the first pivot position may provide more ground clearance.

The size and shape of the tilt plate may be varied as needed for a given application. In some examples, the tilt plate is larger relative to the other components than depicted in the figures. In other examples, the tilt plate is smaller relative to the other components than depicted in the figures. Further, the reader should understand that the tilt plate and the other components may all be larger or smaller than described herein while maintaining their relative proportions.

In the present example, the tilt plate is composed of metal. However, the tilt plate may be composed of any currently known or later developed material suitable for the applications described herein for which it is used. Suitable materials include metals, polymers, ceramics, wood, and composite materials.

Catch Mechanism

Figure 9:
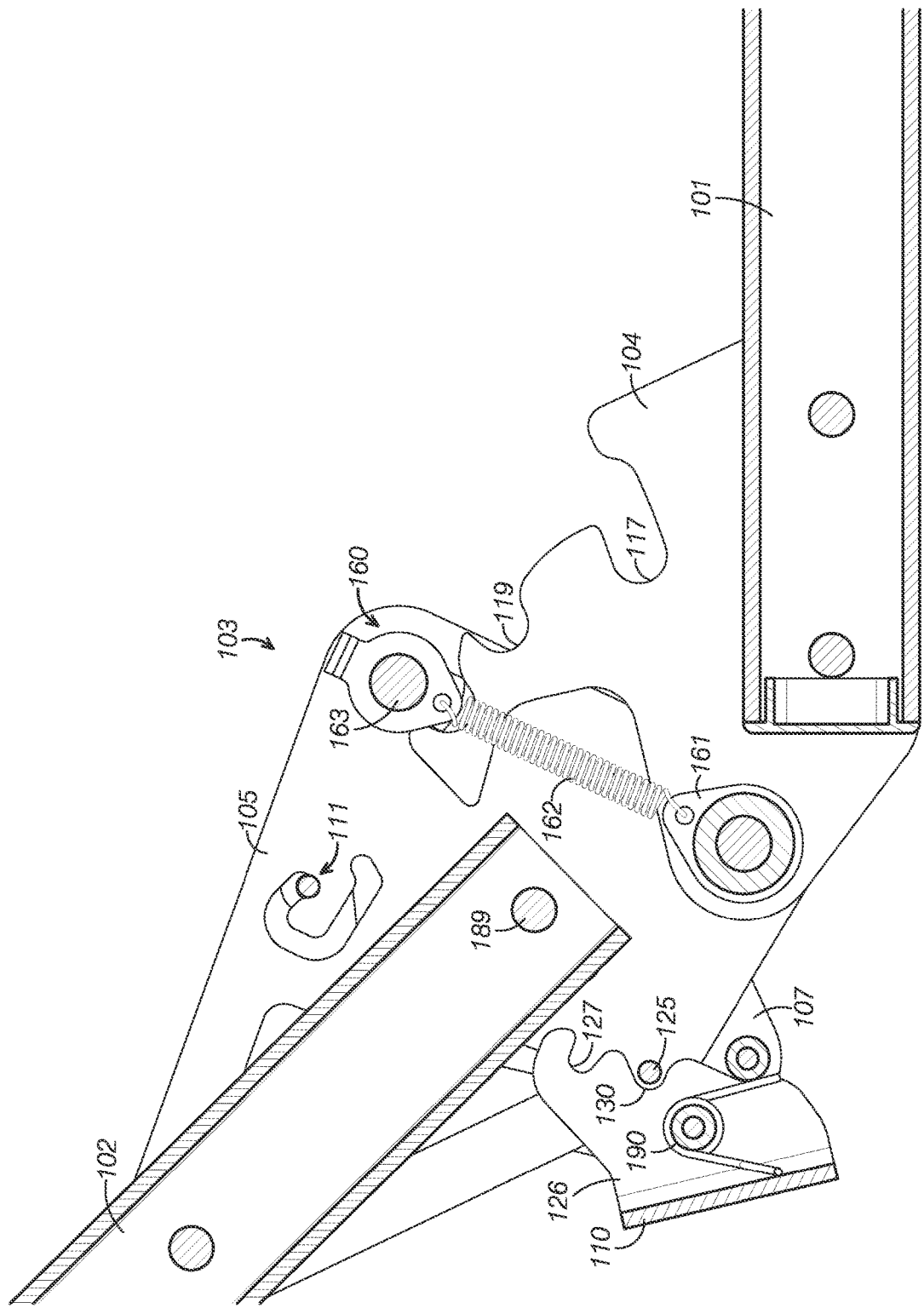
FIG. 9 is a side elevation view of a section of the tilting mechanism shown in FIG. 2 with the tilting mechanism in a third pivot position.
Figure 10:
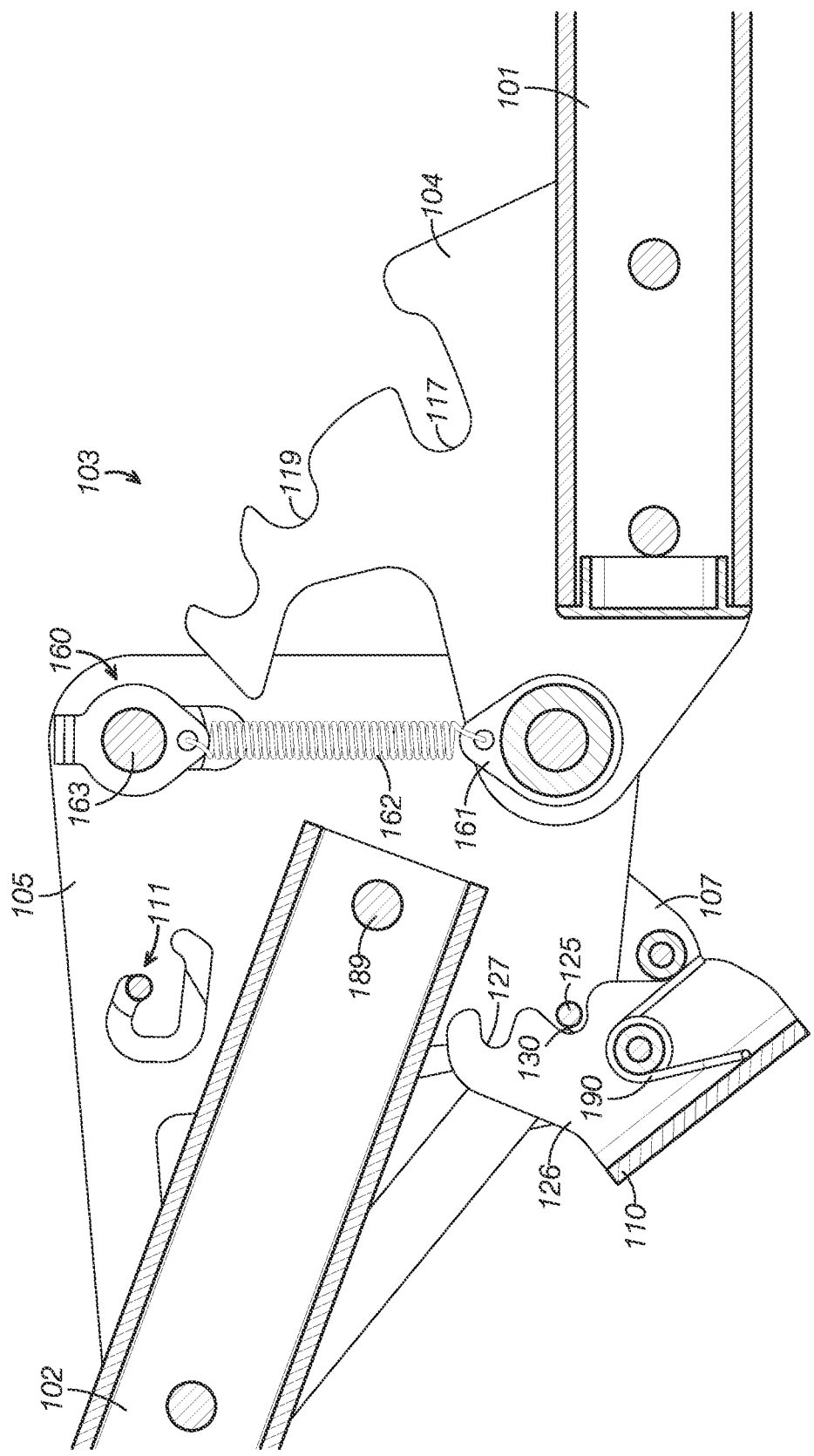
FIG. 10 is a side elevation view of a section of the tilting mechanism shown in FIG. 2 with the tilting mechanism in a fourth pivot position.

Catch mechanism 160 functions to selectively restrict tilt plate 105 pivoting relative to stationary plate 104. Catch mechanism 160 is configured to move between a restriction position 108 and a release position 109. In restriction position 108, catch mechanism 160 restricts tilt plate 105 from pivoting relative to stationary plate 104, such depicted in FIGS. 5 and 6. In release position 109, catch mechanism 160 enables tilt plate 105 to pivot relative to stationary plate 104, such as depicted in FIGS. 7-9.

As shown in FIGS. 5-10, catch mechanism 160 is coupled to stationary plate 104 and to tilt plate 105. With continued reference to FIGS. 5-10, the reader can see that catch mechanism 160 includes an anchor 161, a tether 162, and a catch 163.

As shown in FIGS. 5-10, anchor is pivotally mounted to stationary plate 104. In the present example, anchor 161 mounts to stationary plate via an axle extending through stationary plate 104 and tilt plate 105.

Tether 162 couples anchor 161 and catch 163 together. As shown in FIGS. 5-10, tether 162 extends from anchor 161 to catch 163. As depicted in FIGS. 5-10, tether 162 is resilient and can be selectively lengthened to move catch 163 into release position 109 when catch 163 is pushed away from anchor 161 by push plate 107. After the pushing force on catch 163 is removed, tether 162 resiliently pulls catch 163 back towards anchor 161 into restriction position 108 in one of the pockets.

In the present example, tether 162 is a metal spring. In other examples, the tether is an elastomer rubber spring. An elastomer rubber spring may avoid corrosion as compared to a metal spring. In some examples, the tether is a resilient molded member, which may reduce the number of parts needed. The tether may include a spring and adjacent connecting loop features or may be a one-piece elastomer spring with a spring component and connecting loops integral to the spring component.

With reference to FIGS. 2, 3, 11, and 12, catch 163 extends through catch opening 116 in tilt plate 105. The reader can see in FIGS. 5-12 that catch 163 is operable to selectively restrict tilt plate 105 pivoting relative to stationary plate 104 when catch 163 is disposed in a pocket of stationary plate 104 in restriction position 108. As depicted in FIGS. 5-10, catch 163 is biased towards restriction position 108 by tether 162.

The reader can see in FIGS. 5, 6, 11, and 12 that catch 163 is in restriction position 108 when catch 163 is pulled back towards anchor 161 by tether 162 into one of the pockets defined in stationary plate 104. For example, as shown in FIGS. 5, 6, 11, and 12, catch 163 is in restriction position 108 when catch 163 is disposed in first pocket 117. As depicted in FIGS. 5-8, 11, and 12, catch 163 slides along minor face 123 between first pocket 117 and second pocket 119 when tilt plate 105 tilts relative to stationary plate 104.

In the present example, catch 163 is composed of metal. However, the catch may be composed of any currently known or later developed material suitable for the applications described herein for which it is used. Suitable materials include metals, polymers, ceramics, wood, and composite materials.

The catch mechanism may be any currently known or later developed type of catch mechanism. A variety of catch mechanism types exist and could be used in place of the catch mechanism shown in the figures. In addition to the types of catch mechanisms existing currently, it is contemplated that the cargo racks described herein could incorporate new types of catch mechanisms developed in the future.

The size and shape of the catch mechanism may be varied as needed for a given application. In some examples, the catch mechanism is larger relative to the other components than depicted in the figures. In other examples, the catch mechanism is smaller relative to the other components than depicted in the figures. Further, the reader should understand that the catch mechanism and the other components may all be larger or smaller than described herein while maintaining their relative proportions.

Push Plate

With reference to FIGS. 2, 3, 5-12, push plate 107 is operable to move catch 163 between restriction position 108 and release position 109. As shown in FIG. 5, push plate 107 is restricted from moving catch 163 between restriction position 108 and release position 109 when projection 125 is received in first gate recess 127. Projection 125 and first gate recess 127 cooperate to restrict push plate 107 from moving catch 163 between restriction position 108 and release position 109 by restricting push plate 107 from moving relative to tilt plate 105.

The size and shape of the push plate may be varied as needed for a given application. In some examples, the push plate is larger relative to the other components than depicted in the figures. In other examples, the push plate is smaller relative to the other components than depicted in the figures. Further, the reader should understand that the push plate and the other components may all be larger or smaller than described herein while maintaining their relative proportions.

In the present example, the push plate is composed of metal. However, the push plate may be composed of any currently known or later developed material suitable for the applications described herein for which it is used. Suitable materials include metals, polymers, ceramics, wood, and composite materials.

Actuator

Actuator 110 serves as a safety for tilting mechanism 103 similar to a trigger guard on a grinder. The reader can see in FIGS. 2, 3, 5-12 that actuator 110 is operable to selectively move push plate 107 relative to tilt plate 105 to move catch 163 between restriction position 108 and release position 109. As depicted in FIG. 3, actuator 110 is configured to be manually operated. With reference to FIGS. 1-12, actuator 110 is a foot pedal and is ergonomically designed to push other assemblies.

The reader can see in FIGS. 5-10 that actuator 110 includes a latch plate 126. In the present example, latch plate 126 is integral to other features of actuator 110. In some examples, the latch plate is a separate component coupled to other components of the actuator.

The reader can see in FIGS. 5-10 that latch plate 126 defines a first gate recess 127 and a second gate recess 130. With reference to FIGS. 5-10, second gate recess 130 is spaced from first gate recess 127. First gate recess 127 and second gate recess 130 are each complementarily configured with projection 125 to selectively receive projection 125.

The size and shape of the latch plate may be varied as needed for a given application. In some examples, the latch plate is larger relative to the other components than depicted the figures. In other examples, the latch plate is smaller relative to the other components than depicted in the figures. Further, the reader should understand that the latch plate and the other components may all be larger or smaller than described herein while maintaining their relative proportions.

In the present example, the latch plate is composed of metal. However, the latch plate may be composed of any currently known or later developed material suitable for the applications described herein for which it is used. Suitable materials include metals, polymers, ceramics, wood, and composite materials.

As shown in FIGS. 2, 3, and 5-10, actuator 110 is pivotally mounted to push plate 107. As depicted in FIGS. 5 and 6, actuator 110 is configured to pivot relative to push plate 107 between an engaged position 128 and an unengaged position 129. With reference, to FIGS. 5 and 6, actuator 110 is biased to engaged position 128 with spring 190.

In engaged position 128, first gate recess 127 receives projection 125. In unengaged position 129, first gate recess 127 is spaced from projection 125 such that projection 125 is outside first gate recess 127. As shown in FIGS. 7-10, actuator 110 is restricted from pivoting relative to push plate 107 when projection 125 is received in second gate recess 130.

The actuator may be any currently known or later developed type of actuator. The reader will appreciate that a variety of actuator types exist and could be used in place of the actuator shown in the figures. In addition to the types of actuators existing currently, it is contemplates that the cargo racks described herein could incorporate new types of actuators developed in the future.

The size and shape of the actuator may be varied as needed for a given application. In some examples, the actuator is larger relative to the other components than depicted in the figures. In other examples, the actuator is smaller relative to the other components than depicted in the figures. Further, the reader should understand that the actuator and the other components may all be larger or smaller than described here in while maintaining their relative proportions.

Safety Mechanism

As shown in FIGS. 11 and 12, safety mechanism 111 is operable to selectively restrict push plate 107 from moving relative to tilt plate 105. The reader can see in FIGS. 11 and 12 that safety mechanism 111 includes a safety slot 112 and a safety pin 113.

Safety Slot

With reference to FIGS. 11 and 12, safety slot 112 is defined in tilt plate 105. As depicted in FIGS. 11 and 12, safety slot 112 includes a safety position 114 and a free position 115. Safety position 114 is proximate stationary plate 104. Free position 115 is distal stationary plate 104. As is apparent from FIGS. 11 and 12, safety pin 113 may selectively reside in safety position 114 or free position 115 by moving safety pin 113 within safety slot 112.

Safety Pin

Safety pin 113 functions to selectively restrict tilt plate 105 from moving relative to stationary plate 104. The reader can see in FIGS. 11 and 12 that safety pin 113 is disposed safety slot 112.

As depicted in FIGS. 11 and 12, safety pin 113 abuts stationary plate 104 and push plate 107 in safety position 114 to restrict tilt plate 105 and push plate 107 from moving relative to stationary plate 104. In the present example, safety pin 113 is disposed in second pocket 119 in safety position 114, but may not be disposed in the second pocket or abut the stationary plate in other examples. Indeed, in some examples, the safety pin abuts only the push plate in the safety position. With reference to FIGS. 11 and 12, safety pin 113 is spaced from stationary plate 104 and push plate 107 free position 115 to allow tilt plate 105 and push plate 107 to move relative to stationary plate 104.

The size and shape of the safety pin may be varied as needed for a given application. In some examples, the safety pin is larger relative to the other components than depicted in the figures. In other examples, the safety pin is smaller relative to the other components than depicted in the figures. Further, the reader should understand that the safety pin and the other components may all be larger or smaller than described herein while maintaining their relative proportions.

In the present example, the safety pin is composed of metal. However, the safety pin may be composed of any currently known or later developed material suitable for the applications described herein for which it is used. Suitable materials include metals, polymers, ceramics, wood, and composite materials.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A cargo rack comprising:
   a tongue; a mast; and a tilting mechanism pivotally coupling the mast and the tongue, the tilting mechanism including:
   a stationary plate coupled to the tongue;
   a tilt plate coupled to the mast and pivotally coupled to the stationary plate;
   a catch operable to selectively restrict the tilt plate pivoting relative to the stationary plate;
   and a push plate operable to move the catch between a restriction position restricting the tilt plate from pivoting relative to the stationary plate and a release position enabling the tilt plate to pivot relative to the stationary plate;

a safety mechanism operable to selectively restrict the tilt plate from moving relative to the stationary plate;
wherein the safety mechanism further includes:
a safety slot defined in the tilt plate;
and a safety pin disposed in the safety slot;
wherein the safety slot includes:
a safety position proximate the stationary plate in which the safety pin may selectively reside;
wherein the safety pin abuts the stationary plate in the safety position to restrict the tilt plate from moving relative to the stationary plate.

2. The cargo rack of claim 1, wherein:
the safety slot includes a free position distal the stationary plate in which the safety pin may selectively reside; and
the safety pin is spaced from the stationary plate in the free position to allow the tilt plate to move relative to the stationary plate.

3. The cargo rack of claim 1, wherein the tilt plate and the push plate share two common pivots.

4. A cargo rack comprising:
a tongue; a mast; and a tilting mechanism pivotally coupling the mast and the tongue, the tilting mechanism including:
a stationary plate coupled to the tongue;
a tilt plate coupled to the mast and pivotally coupled to the stationary plate;
a catch operable to selectively restrict the tilt plate pivoting relative to the stationary plate;
and a push plate operable to move the catch between a restriction position restricting the tilt plate from pivoting relative to the stationary plate and a release position enabling the tilt plate to pivot relative to the stationary plate;
a safety mechanism operable to selectively restrict the tilt plate from moving relative to the stationary plate;
wherein the safety mechanism further includes:
a safety slot defined in the tilt plate;
and a safety pin disposed in the safety slot;
wherein the safety slot includes:
a safety position proximate the stationary plate in which the safety pin may selectively reside;
wherein the safety pin abuts the stationary plate in the safety position to restrict the tilt plate from moving relative to the stationary plate; wherein the catch is biased towards the restriction position; wherein the tilt plate defines a catch opening; the catch opening is complementarily configured with the catch; and the catch extends through the catch opening; wherein the stationary plate defines a first pocket; the first pocket is complementarily configured with the catch; and the mast is in a first pivot position relative to the tongue when the catch is in the first pocket.

5. The cargo rack of claim 4, wherein:
the stationary plate defines a second pocket;
the second pocket is complementarily configured with the catch;
the second pocket is disposed along a tilt arc defined by the tilt plate pivoting relative to the stationary plate;
the tilt plate is restricted from pivoting relative to the stationary plate when the catch is disposed in the second pocket;
the mast is in a second pivot position relative to the tongue when the catch is in the second pocket; and
the second pivot position is angularly spaced from the first pivot position.

6. The cargo rack of claim 4, wherein:
the mast is oriented vertically and substantially perpendicular to the tongue in the first pivot position; and
the mast is tilted away from the tongue about an obtuse angle in the second pivot position.

7. The cargo rack of claim 6, wherein:
the stationary plate includes a minor face; and
the catch slides over the minor face between the first pocket and the second pocket.

8. The cargo rack of claim 6, further comprising an actuator operable to selectively move the push plate relative to the tilt plate.

9. A cargo rack comprising:
a tongue; a mast; and a tilting mechanism pivotally coupling the mast and the tongue, the tilting mechanism including:
a stationary plate coupled to the tongue;
a tilt plate coupled to the mast and pivotally coupled to the stationary plate;
a catch operable to selectively restrict the tilt plate pivoting relative to the stationary plate;
and a push plate operable to move the catch between a restriction position restricting the tilt plate from pivoting relative to the stationary plate and a release position enabling the tilt plate to pivot relative to the stationary plate;
a safety mechanism operable to selectively restrict the tilt plate from moving relative to the stationary plate;
wherein the safety mechanism further includes:
a safety slot defined in the tilt plate;
and a safety pin disposed in the safety slot;
wherein the safety slot includes:
a safety position proximate the stationary plate in which the safety pin may selectively reside;
wherein the safety pin abuts the stationary plate in the safety position to restrict the tilt plate from moving relative to the stationary plate;
further comprising an actuator operable to selectively move the push plate relative to the tilt plate; wherein the actuator is a foot pedal; wherein the actuator is pivotally mounted to the push plate.

10. The cargo rack of claim 9, wherein:
the tilt plate incudes a projection proximate the actuator;
the actuator includes a latch plate;
the latch plate defines a first gate recess complementarily configured with the projection to receive the projection; and
the push plate is restricted from moving relative to the tilt plate when the projection is received in the first gate recess.

11. The cargo rack of claim 10, wherein the actuator is configured to pivot relative to the push plate between an engaged position where the first gate recess receives the projection and an unengaged position where the first gate recess is spaced from the projection such that the projection is outside the first gate recess.

12. The cargo rack of claim 11, wherein the actuator is biased to the engaged position.

13. The cargo rack of claim 10, wherein:
the latch plate defines a second gate recess complementarily configured with the projection to receive the projection;
the second gate recess is spaced from the first gate recess; and
the actuator is restricted from pivoting relative to the push plate when the projection is received in the second gate recess.

14. A cargo rack comprising:
a tongue; a mast; and a tilting mechanism pivotally coupling the mast and the tongue, the tilting mechanism including:
a stationary plate coupled to the tongue;
a tilt plate coupled to the mast and pivotally coupled to the stationary plate;
a catch operable to selectively restrict the tilt plate pivoting relative to the stationary plate;
and a push plate operable to move the catch between a restriction position restricting the tilt plate from pivoting relative to the stationary plate and a release position enabling the tilt plate to pivot relative to the stationary plate; and
an actuator, wherein the actuator includes:
a foot pedal,
and where the stationary plate has a first pocket and a second pocket; where the foot pedal is operable to selectively move the push plate relative to the tilt plate, between a restricted position where the catch is engaged in the first or second pocket and a release position where the catch is disengaged with the first or second pocket; and wherein the actuator further includes:
a projection,
a spring,
and a latch plate,
where the latch plate has a first gate recess and a second gate recess, where first and second gate recesses are complementarily configured with the projection to selectively receive the projection, where the foot pedal is pivotally mounted relative to the push plate in a manner to move the push plate between an engaged position and a disengaged position and, where in the engaged position the projection resides in the first or second gate recess and in the disengaged position the projection is outside the first or second gate recess, and where the foot pedal is biased to engage with the spring.

15. Where the actuator of claim 14 further comprises: a two-stage system where the latch plate must first disengage from the pocket before the push plate can move to allow the catch to disengage from the stationary plate.

16. The actuator of claim 15 that when pivoting in the clockwise direction relative to the tongue the latch plate must first disengage from the projection before the catch can disengage from the stationary plate, and in the counterclockwise direction relative to the tongue the catch can engage the stationary plate without first disengaging the latch plate from the stationary plate.

17. The cargo rack of claim 14 wherein: the stationary plate has at least one pocket with an angled back face that allows the catch and mast to move freely in one direction but requires use of the foot pedal to move in the opposing direction.

18. A cargo rack comprising:
a tongue;
a mast; and
a tilting mechanism pivotally coupling the mast and the tongue, the tilting mechanism including:
a stationary plate coupled to the tongue; and
a tilt plate coupled to the mast and pivotally coupled to the stationary plate;
a catch operable to selectively restrict the tilt plate pivoting relative to the stationary plate;
and a push plate operable to move the catch between a restricted position restricting the tilt plate from pivoting relative to the stationary plate and a release position enabling the tilt plate to pivot relative to the stationary plate, where the stationary plate provides an abutment that acts as a stop that limits the range of pivot of the tilt plate relative to the stationary plate.

\* \* \* \* \*